Figure 1:
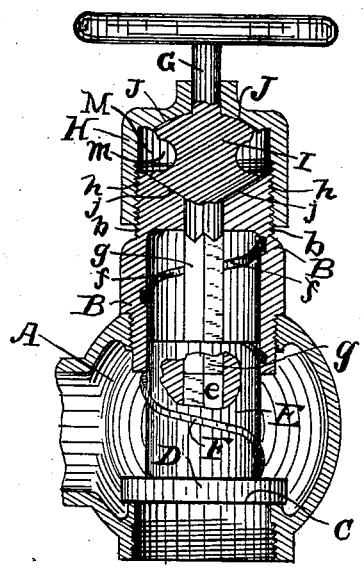

L. W. EGGLESTON.
VALVE.
APPLICATION FILED MAY 13, 1907.

918,301.

Patented Apr. 13, 1909.

Witnesses.
C. A. Adams.
Geo. E. Rowe

Inventor;
Lewis W. Eggleston,
By Charles Turner Browne
Atty

THE NORRIS PETERS CO., WASHINGTON, D. C.

UNITED STATES PATENT OFFICE.

LEWIS W. EGGLESTON, OF APPLETON, WISCONSIN.

VALVE.

No. 918,301.  Specification of Letters Patent.  Patented April 13, 1909.

Application filed May 13, 1907. Serial No. 373,449.

*To all whom it may concern:*

Be it known that I, LEWIS W. EGGLESTON, a citizen of the United States, and a resident of Appleton, in the county of Outagamie, in the State of Wisconsin, have invented certain new and useful Improvements in Valves, of which the following, when taken in connection with the drawing accompanying and forming a part hereof, is a full and complete description sufficient to enable those skilled in the art to which it pertains to understand, make, and use the same.

This invention relates to steam and hot water supply valves for radiators, and the like. And the object of this invention is to obtain, at small cost, a durable, packless valve which will be air, steam and water tight.

Figure 2:
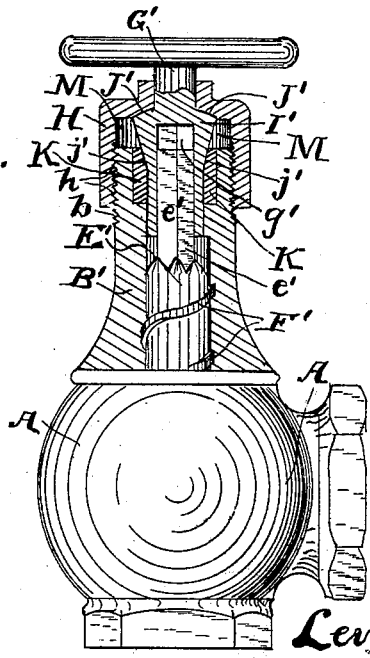

In the drawing referred to Figure 1 is a vertical sectional view of a valve embodying this invention, and Fig. 2 is a view of a modification of the construction illustrated in Fig. 1 with the several parts embodying this invention in vertical section.

A reference applied to designate a given part is used to indicate such part throughout the several figures of the drawing, wherever the same appears.

A is the shell or casing of the device.

B, Fig. 1, and B', Fig. 2, are bonnets to casing A.

C, Fig. 1, is a valve seat and D the valve co-acting with such valve seat.

E, Fig. 1, and E', Fig. 2, are, respectively, the stems of valve D.

F, F, are screw threads on stem E fitting into corresponding screw threads $f$ in bonnet B and $e$ is a squared hole in stem E.

F' are screw threads on stem E' and $e'$ is the squared end of stem E'.

G, Fig. 1, and G', Fig. 2, is the hand wheel stem of the device. When stem G or G' is rotated the valve D is raised from or seated on the valve seat C, depending upon the direction in which such stem is rotated. Stem G is provided with squared end $g$ fitting into the hole $e$ in stem E, such hole $e$ being square in cross section. Stem G' is provided with a hole which is square in cross section, and the squared end $e'$ of stem E', (Fig. 2), fits therein. Such squared ends $g$ and $e'$ are movable longitudinally in their respective holes $e$ and $g'$.

H is a cap provided with screw threads $h$ tightly fitting over the screw threads $b$ on bonnets B, and B', respectively.

I and I' are enlargements of the respective stems G, G'; and such enlargements are provided with contact faces on the upper sides thereof, respectively, which co-act with the contact faces J, J', on the under face of caps H, H. Enlargement I is provided with a contact face on the under side thereof which co-acts with the contact face $j$ on bonnet B, and the enlargement I' is provided with a contact face which is arranged to co-act with the contact face $j'$ on ring K in bonnet B', (Fig. 2). Ring K is held in a recess in the upper end of the bonnet B', and the metal of which such ring is made may be harder or softer (or of the same density) than the metal of the enlargement I' or bonnet B'.

M is a chamber in which lubricating material, as plumbago, grease or oil, may be held, to render the valve more durable, as well as to obtain the advantages of having such lubricating material present in the making of an air tight joint; it being particularly useful with reference to such air tight joint when the valve is used on the steam supply end of a radiator in a vacuum steam heating system.

In the construction illustrated in Fig. 1 the enlargement I is cut away in the central portion thereof to obtain the recess $m$, increasing the size of the lubricating chamber M.

In both constructions shown the enlargement of the hand wheel stem is integral with such stem, being formed of the same material or of metal which may be brazed or otherwise joined thereto.

In the construction illustrated in Fig. 1 contact face $j$ is integral with the bonnet B, while in the construction illustrated in Fig. 2 contact face $j'$ is shown not integral with bonnet B'; and the material of which such contact face $j'$ is made may be a metal harder or softer than the metal of the enlargement I', I prefer it to be softer, as copper. When ring K, (having contact face $j'$ thereon) is of copper the contact face of the enlargement I' which is in contact with the contact face $j'$ may be forced down on to its contact face by turning the cap H with a wrench so as to make a tight joint without grinding.

The several contact faces J, j and J', j', with the co-acting contact faces on enlargement I or I', may have a ground fit, if desired.

The principal difference in construction in the devices shown in Figs. 1 and 2 is in placing a squared hole in the valve stem and enlarging the diameter of such stem (in Fig. 2) over the stem in Fig. 1; and in squaring the upper end of the valve stem in Fig. 1. In both constructions no longitudinal strain is brought on to the several valve seats in the bonnet and cap thereof by the operation of the device.

Having thus described my invention, what I claim is new and desire to secure by Letters Patent is—

1. A valve casing, a bonnet to the casing, a cap to the bonnet, a valve seat in the casing, a contact face in the bonnet, and a contact face in the cap, in combination with a longitudinally movable valve provided with a stem and arranged to co-act with the valve seat in the casing, a rotatable stem arranged to engage with the stem of the valve and move such valve and stem longitudinally, such rotatable stem provided with an enlarged portion having contact faces on the upper and under faces thereof arranged to co-act with coacting contact faces in the bonnet and cap respectively, and a receptacle arranged to contain lubricating material adjacent to the enlarged portion of the rotatable stem; substantially as described.

2. A valve casing, a bonnet to the casing, such bonnet provided with screw threads, a cap to the bonnet, such cap provided with screw threads intermeshing with the screw threads on the bonnet, a valve seat in the casing, a contact face in the bonnet and a contact face in the cap, in combination with a longitudinally movable valve provided with a valve stem and arranged to co-act with the valve seat in the casing, a rotatable stem arranged to engage with the stem of the valve to move such valve and stem longitudinally, such rotatable stem provided with an enlarged portion having contact faces on the upper and under surfaces thereof to co-act with the contact face in the bonnet and cap, respectively, and a receptacle arranged to contain lubricating material adjacent to the enlarged portion of the rotatable stem; substantially as described.

LEWIS W. EGGLESTON.

In the presence of—
 CORA A. ADAMS,
 CHARLES TURNER BROWN.